Aug. 7, 1951 G. H. KELLOGG 2,563,339
PILOT BRAKE FOR MOTOR VEHICLES
Filed Sept. 28, 1949

INVENTOR.
GEORGE H. KELLOGG
BY
ATTORNEY

/ Patented Aug. 7, 1951

2,563,339

UNITED STATES PATENT OFFICE 2,563,339

PILOT BRAKE FOR MOTOR VEHICLES

George H. Kellogg, San Diego, Calif.

Application September 28, 1949, Serial No. 118,441

4 Claims. (Cl. 74—486)

My invention relates to a pilot brake for motor vehicles and its objects are to furnish a better and more rapid means, manually exerted on the steering wheel of an automobile for applying the brakes thereof; to allow such manual means to be exerted in connection with, or independently of, the conventional foot brake; to provide a brake applying means immediately accessible to the hands of the operator without requiring the change of his foot from the accelerator to the foot brake and the loss of time occasioned thereby; to afford the operator of a motor vehicle a steering and braking means centrally controlled and disposed for instant action and manually governed for stopping or slowing down such vehicle as occasion requires; to allow the usual operation of the vehicle without interference to the normal conventional application of the foot brake; to furnish a means, when a motor vehicle stops or is compelled to come to a stop on an upgrade upon a road, for the driver manually to apply the brakes through the steering wheel while one hand is resting thereon, and while the other hand and both feet are free to accelerate the engine and to shift the clutch, thereby bringing about a "hill-hold" through the exercise of the pilot brake; to guard against disassembling or non adjusting of the parts and possible dragging of brakes; to render the parts accessible for inspection, adjustment, replacement, restoration, or repair, and generally to provide a pilot brake which is simple and economical of construction, efficient in action and of prolonged life and durability. My invention further consists of other novel features of construction, and combinations and arrangements of parts and elements illustrated in the drawing, and hereinafter more specifically described and claimed.

I am aware that in the prior art there are disclosed stopping devices located upon or adjacent to the steering wheel of an automobile for automatically causing the application of the brake, should the operator become incapacitated and his hands involuntarily slip from said wheel; but prior to my invention so far as I am informed, there were in existence no practicable pilot brake devices associated with the steering wheel for the immediate manual application of the brake, irrespective of, or in cooperation with, the foot pedal. In this general aspect, my invention is the result of considerable study of the problem of how to permit the driver of a motor vehicle immediately to apply the brake through manual means exerted through the steering wheel, and to furnish a means, when a motor vehicle stops or compelled to stop on an upgrade road, to leave his feet free to operate the clutch pedal and accelerator pedal when occasion requires both of these pedals to be operated at the same time and still to prevent the vehicle from rolling backwardly down hill, and utilize the time-lost period caused by the lapse of time required by such driver in taking his foot off the accelerator, and applying said foot to the brake pedal; and I believe myself to be the first person in the art to effect a satisfactory solution of this problem through the construction and operation of the embodiment of my invention hereinafter set forth.

Attention is hereby directed to the accompanying drawing, illustrating a preferred form of my invention, in which similar numerals of designation refer to similar parts throughout the several views and in which—

Figure 1:
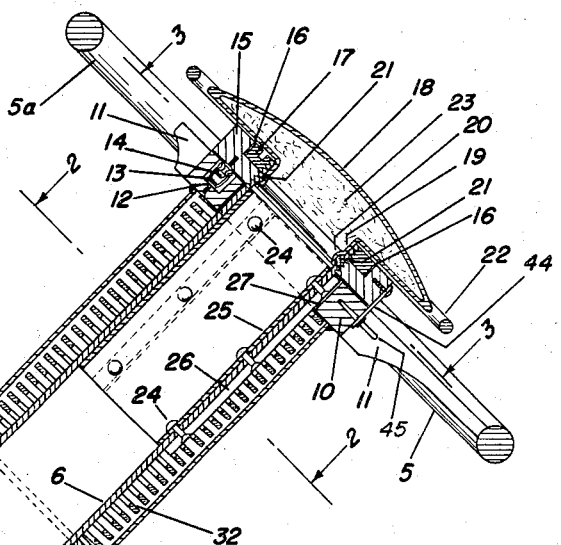
Figure 1 is a side elevation partly in section of a steering post, steering wheel, push sleeve, push rod and adjacent parts embodying my invention.
Figure 2:
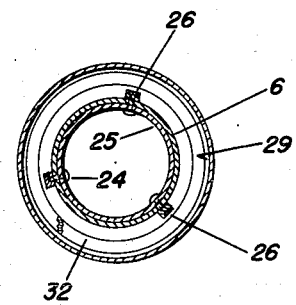
Fig. 2 is a transverse section on line 2—2 of the view shown in Fig. 1, looking in the direction of the arrows.
Figure 4:
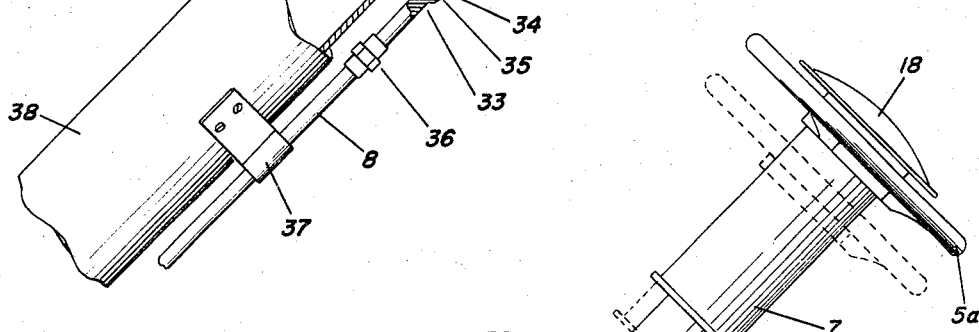
Fig. 4 is a side elevation in reduced scale of the device shown in Fig. 1 illustrating more particularly the operative connections with the conventional foot pedal lever for operating the master cylinder of the usual fluid braking system.
Figure 3:
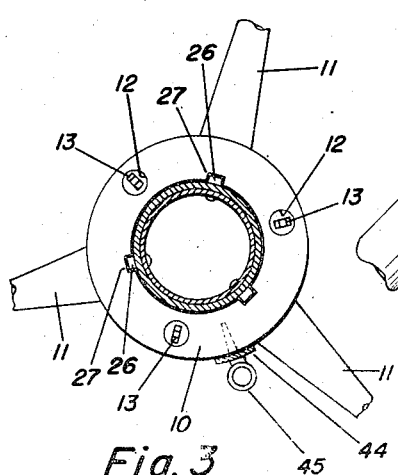
Fig. 3 is a transverse section on line 3—3 of the view shown in Fig. 1 just above the hub of the steering wheel, looking in the direction of the arrows.

Referring to the drawing, the braking apparatus there illustrated generally comprises the motor vehicle steering wheel 5, cylindrical steering post 6, sliding hub 10, push sleeve member 7 and connections thereof with said wheel, push rod 8, pedal lever 9, and cooperative parts.

The steering wheel 5, is provided with the hub 10, from which radially extends the arms 11, the ends of which are firmly affixed to, or form an integral part of, the rounded rim 5a, shaped for ready and convenient operation by the hands of the driver. Depressed within the hub 10, and equally spaced apart are the three wells or pockets 12, within which are respectively seated and secured the three female spring clips 13, shaped and positioned respectively to receive and to make detachable engagement with the rounded heads of the correspondingly spaced three male pins 14, the shanks of which are embedded within and secured to the bottom portion of the collar 15; the wheel 5, being thereby made manually detachable from the collar 15, upon the requisite downward pressure being applied thereto. Ordinarily the pressure of the hands of the driver resting upon the wheel in the usual operation of the vehicle will be insufficient to overcome the tension of the grip of the spring clips 13 upon the heads of the pins 14, so that considerable downward pressure manually applied will be required to effect such detachment. Preferably, the spring clips employed by me are constructed to withstand a pressure of not exceeding twenty (20) pounds before releasing said pins; and if desired, a conventional electrical warning buzzer signal observable by the driver readily could be associated with these separable parts to indicate when such pressure is exceeded. As shown, the collar 15 is threaded to engage with the top of the steering post 6, and atop said collar 15 is the nut 17, also in threaded engagement with said post 6; the said nut being normally in close contact with the bottom of the hollow horn button 18.

In order to secure with removably accurate centering the said button to the top of the steering post, I preferably provide said button with the downwardly extending circular extension 19, the lower end of which is formed with the annular channel 20, shaped detachably to engage with the bead 21, formed in the wall of said post. To the periphery of said horn button, is secured the usual horn ring 22, with conventional connections for sounding the same (not shown), and preferably the hollow of said button is filled or padded with a mass of rubber-like material 23, to form a resilient buffer to reduce or break the impact of the body of the driver or any part thereof with the said wheel or post top end occasioned by a collision or by the sudden stopping of the car for any other reason.

Within the top portion of the cylindrical post 6, and closely fitting the wall thereof and firmly affixed thereto by rivets 24, is the lining 25, the shanks of which rivets extending through both said lining and said wall through openings provided therefor are firmly secured to the three keys 26, in close contact with the outer face of said wall, equally spaced apart and extending longitudinally in respect to said post. Positioned and shaped to make sliding contact with said keys are the three keyways 27, formed in the wall inside of hub 10, and permitting the wheel 5, upon downward pressure thereof to release its spring clip attachment to the collar 15, and to be slid downwardly for the purpose presently to be described.

Welded to the bottom of the hub 10, and encasing the post 6, is the push sleeve 7, the wall of which equally spaced from the wall of said post forms the cylindrical chamber 29, and the lower end of which sleeve is welded to the foot ring 30, in sliding engagement with said post. Within said chamber and separated from the wall of said sleeve is the stop ring 31 welded to the wall of post 6, leaving normally a substantial space between said stop ring and the sliding foot ring 30; and resting upon the ring 31, within said chamber 29, encompassing the post 6, and extending to and contacting the bottom of hub 10, is the helical compression spring 32.

Formed within the under side of the foot ring 30, is an annular recess providing the raceway 28, adapted and positioned to make contact with the ball bearing 34, mounted within the swagecap 35 at the upper end 33 of the push rod 8.

Preferably, in order to provide longitudinal adjustment thereof, the rod 8 is made in two sections connected by the sleeve coupling 36, the upper section carrying the swagecap 35, and the lower section being mounted to slide longitudinally within the bearing 37 affixed to the conventional casing 38, serving as a socket for the post 6, and extending through the dash board 39 of the car. The lower end portion of said lower section of the push rod 8 also extends, with ample clearance, through the opening 40 provided therefor in said dash board, and is bent downwardly to form the loop 41 in sliding engagement with the pin bearing 42 mounted upon the lever 9 of the conventional foot pedal 43; which lever 9 is adapted to be connected in any manner well known in the art with the conventional master cylinder braking system of an automobile, except for its linkage with the push rod 8 as above described. Preferably, the stop ring 31 is so located as to control the downward throw of the steering wheel and associated parts to substantially the extent required for the application of the brake, such throw not exceeding ordinarily a stroke of two and one-half inches.

To operate my improved pilot brake, should occasion arise, the action required by the driver is manually to exert sufficient downward pressure or impulse upon the steering wheel to detach the connection of the spring clips 13 from the grip of the pins 14, thereby releasing the hub of said wheel from its engagement with the collar 15 affixed to the top of the steering post, and thereupon, through continuance of said pressure causing the push sleeve 7 together with the push rod 8 and hub 10, to be slid downwardly, and, through the connection of said push rod with the pedal lever 9, to bring about the application of the brake in the same manner as if the foot of said driver were pressed down upon the pedal 43. While the brake is so applied, an important result is that the feet of the driver are left free for action as aforesaid for operation of the accelerator and for the shifting of the clutch for hill-hold purposes. When the downward manual pressure upon the steering wheel is released, the spring clips 13 and pins 14 may be again snapped together and connected and the parts will be allowed to be restored to their normal relative position and relationship, such restoration being ordinarily accomplished by the expansion of spring 32 aided by the return action of the customary pedal retracting spring.

It accordingly follows that as a driver becomes more and more familiar with the operation and performance of my pilot brake, he will readily acquire the habit of using such device to the exclusion of the foot brake with great saving of time and improved efficiency of operation. This is particularly true relative to the use of my device in respect to fluid driven vehicles, with the further advantage that the push rod 8 may, as is obvious, be connected with the selector lever instead of the foot brake lever; in which case, the rear driving wheels operating in reverse, supply, in time of emergency, a most efficient means of stopping the vehicle.

In order that the steering wheel may, if desired, be secured against longitudinal sliding engagement with the steering post, I preferably provide the locking means shown in Fig. 1, comprising the tab or tongue 44, whose upper end portion is firmly secured to the wall of the collar 15, and whose lower end portion has an opening through which extends longitudinally the tapered slip pin 45, shaped to effect wedging engagement with a socket to receive the same in the wall of the hub.

My invention may be embodied in other specific forms without departing from the spirit or essential characteristics thereof. The present embodiment, as above set forth is, therefore, to be considered in all respects as illustrative and not restrictive, the scope of my invention being indicated by the appended claims rather than by the foregoing description, and all changes which may come within the meaning and range of equivalency of the claims are therefore intended to be embraced therein.

What I claim and desire to secure by Letters Patent is:

1. A pilot brake steering wheel assembly for motor vehicles, comprising a steering post, a steering wheel having a hub and being slidably mounted upon said post and turning therewith, spring clip means for manually connecting and detaching the hub of said wheel from the upper part of said post, compression spring means engaging with said hub and mounted upon said post so as to restore automatically the connection of said hub and post after detachment; and a sliding thrust rod connected with said hub and longitudinally pushed thereby and operatively connected to the brake member of the vehicle so that the said member may be operated independently of the foot of the driver, leaving his feet free to shift the clutch and accelerator of said vehicle.

2. A pilot brake steering wheel assembly for motor vehicles, comprising a steering post, a steering wheel having a hub and being slidably mounted upon said post and turning therewith, spring actuated means for manually connecting and detaching the hub of said wheel from the upper part of said post, a push sleeve encompassing said post below said hub and connected thereto and both turning and moving longitudinally therewith, a helical compression spring mounted upon said post within said sleeve so as to restore automatically the connection of said hub and post after manual detachment; and a sliding thrust rod contacting with the end of said sleeve and longitudinally pushed thereby and operatively connected to the brake member of the vehicle so that the said member may be operated independently of the foot of the driver, leaving his feet free to shift the clutch and accelerator of said vehicle.

3. A pilot brake steering wheel assembly for motor vehicles, comprising a steering post; a steering wheel having a hub and being slidably mounted upon said post and turning therewith; spring actuated means for manually connecting and detaching the hub of said wheel from the upper part of said post; a push sleeve encompassing said post below said hub and connected thereto and both turning and moving longitudinally therewith, the lower end of said sleeve being secured to a foot ring with raceway on the under side thereof; a helical compression spring mounted upon said post within said sleeve so as to restore automatically said connection of said hub and post after detachment; and a sliding push rod whose upper end is provided with a ball bearing positioned to make circular moving contact with said raceway, and longitudinally to be pushed downwardly by said sleeve; said rod being operatively connected to the brake member of the vehicle so that the said member may be operated independently of the foot of the driver, leaving his feet free to shift the clutch and accelerator of said vehicle.

4. A pilot steering wheel assembly for motor vehicles having a fluid drive, comprising a steering post; a steering wheel having a hub and being slidably mounted upon said post and turning therewith; spring actuated means for manually connecting and detaching the hub of said wheel from the upper part of said post; a push sleeve encompassing said post below said hub and connected thereto and both turning and moving longitudinally therewith, the lower end of said sleeve being secured to a foot ring with raceway on the underside thereof; a helical compression spring mounted upon said post within said sleeve so as to restore automatically said connection of said hub and post after detachment; and a sliding push rod whose upper end is provided with a ball bearing positioned to make circular moving contact with said raceway, and longitudinally to be pushed downwardly by said sleeve; said rod being operatively connected to the brake member of the vehicle so that said member may be operated independently of the foot of the driver, leaving the foot free to operate the accelerator pedal when required.

GEORGE H. KELLOGG.

REFERENCES CITED

The following references are of record in the file of this patent:

UNITED STATES PATENTS

| Number | Name | Date |
| --- | --- | --- |
| 1,519,172 | Stewart | Dec. 16, 1924 |
| 1,841,294 | Nicholson | Jan. 12, 1932 |
| 2,129,863 | Neracher | Sept. 13, 1938 |
| 2,197,671 | Vergara | Apr. 16, 1940 |
| 2,207,954 | Tate | July 16, 1940 |
| 2,223,800 | Fines | Dec. 3, 1940 |
| 2,494,547 | Fish | Jan. 17, 1950 |

FOREIGN PATENTS

| Number | Country | Date |
| --- | --- | --- |
| 485,304 | Great Britain | May 18, 1930 |